May 29, 1951 — A. C. PETERSON — 2,554,590
COMBINED AIR PROPELLER AND WHEEL DRIVE FOR
EFFECTING VEHICLE PROPULSION
Filed Dec. 20, 1945 — 2 Sheets-Sheet 1

INVENTOR
Adolph C. Peterson

May 29, 1951   A. C. PETERSON   2,554,590
COMBINED AIR PROPELLER AND WHEEL DRIVE FOR
EFFECTING VEHICLE PROPULSION

Filed Dec. 20, 1945   2 Sheets-Sheet 2

INVENTOR
Adolph C. Peterson.

Patented May 29, 1951

2,554,590

UNITED STATES PATENT OFFICE 2,554,590

COMBINED AIR PROPELLER AND WHEEL DRIVE FOR EFFECTING VEHICLE PROPULSION

Adolphe C. Peterson, Minneapolis, Minn.

Application December 20, 1945, Serial No. 636,174

4 Claims. (Cl. 180—54)

My invention relates to automotive vehicle driving and power means and particularly to a form of such means which has a multiple number of means for driving the vehicle.

The principal objects of my invention are to provide a form of automotive vehicle driving means which means shall be simple in its component parts, efficient in use and especially convenient in use. The objects are more specifically stated as follows. The primary object is to provide a form of power driving means for automotive vehicles which will inherently have the ability to adapt its drive automatically to changing conditions, so that in starting the vehicle, or in heavy load conditions such as when hill climbing or when road conditions are difficult or when the carried load is especially heavy, the application of the power to the driving means will automatically adopt the relation of driving which procures the necessary pull or thrust upon the vehicle to effect the traveling of the vehicle. To accomplish this purpose, and incidentally as a result, ease of manual control, this driving means utilizes a dual method of application of the engine power, so that part of that power delivery may be through the road wheels to procure travel torque upon the vehicle, and so that the remaining part of the power application is made through other means, namely an air thrusting means, there being thus a division of the driving power between the two methods of propulsion. The division of the propulsive power of the engine means between the two methods of propulsion results in automatic division of the power between the two application means somewhat in relation to the conditions of load and travel, so that no manual effort or thought is necessary to accomplish this automatic division. This automatic division, will result in such increase of power application through one of the means, as will result in more full availability of the maximum power output of the engine under all conditions, especially at starting of the load and for hill climbing.

It is intended that this form of driving means shall be especially adapted and available for the higher speed vehicles, such as passenger automobiles, and passenger buses, and other vehicles, which are intended to travel at high speeds, especially upon express highways.

It is an object to make this divisional application of the power delivery available through a simple means such as is herein disclosed. A further object is to provide an automotive vehicle drive means which by reason of the dual application of the power for propulsion, results in increase of the efficiency of the propulsion of the vehicle in travel on a road-bed, thereby increasing the net efficiency in the use of the fuel utilized for the propulsive power. Other advantages, such as durability, result from the more gentle application of the power to achieve overcoming of load drag, especially in starting. Another advantage results from ability to utilize the unusual characteristics of this driving means for rapid braking of the vehicle or for braking in descents of hills under slippery conditions.

The principal devices and combinations of devices comprising my invention, are as hereinafter described and as defined in the claims. In the accompanying drawings which illustrate my invention in several different forms, like characters refer to like parts throughout the several views. Referring to the drawings:

Figure 1 is a view chiefly in vertical cross section in the plane of the longitudinal center of an automotive vehicle embodying my invention, this figure showing, behind the section, one of the rear wheels of the vehicle and a portion of the vehicle chassis frame immediately adjacent the section being on the lines 1—1 of Figures 2 and 4, some parts being shown in full side elevation and some parts being broken away.

Figure 3:
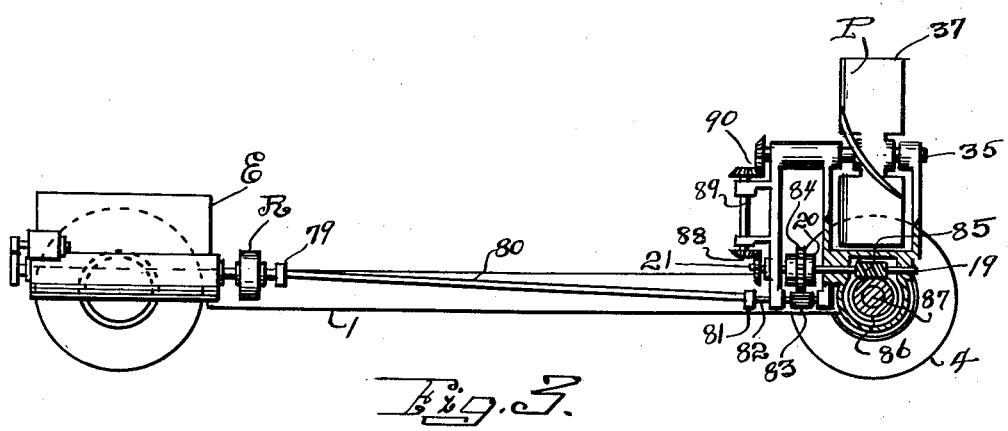
Figure 3 is a view of a modified form of my propulsion means, to show especially the application of my invention to a front engine construction, this figure being in part a vertical section through the plane at the longitudinal center of a vehicle embodying my invention, illustrating road wheels at one side of the vehicle chassis, and showing some parts, as the engine, in full side elevation.
Figure 5:
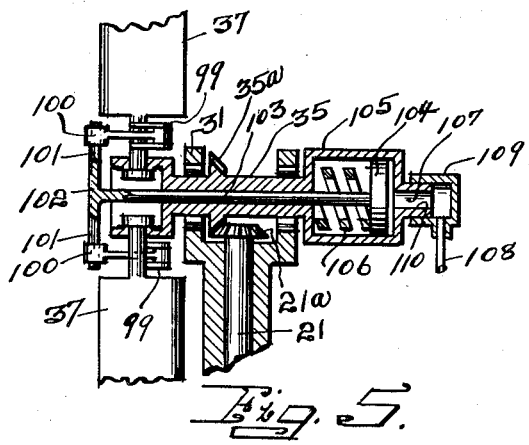

Figure 5 is a view in detail of a modified form of feathering means or air propeller blade incidence changing means, in connection with the propeller drive means, the figure being a section through the axis of the air propeller drive means, some parts being shown in side elevation, some parts being broken away. This is a form of incidence changing means which may be applied to either of the forms of my device, as shown in Figure 1 or 3.

Figure 1:
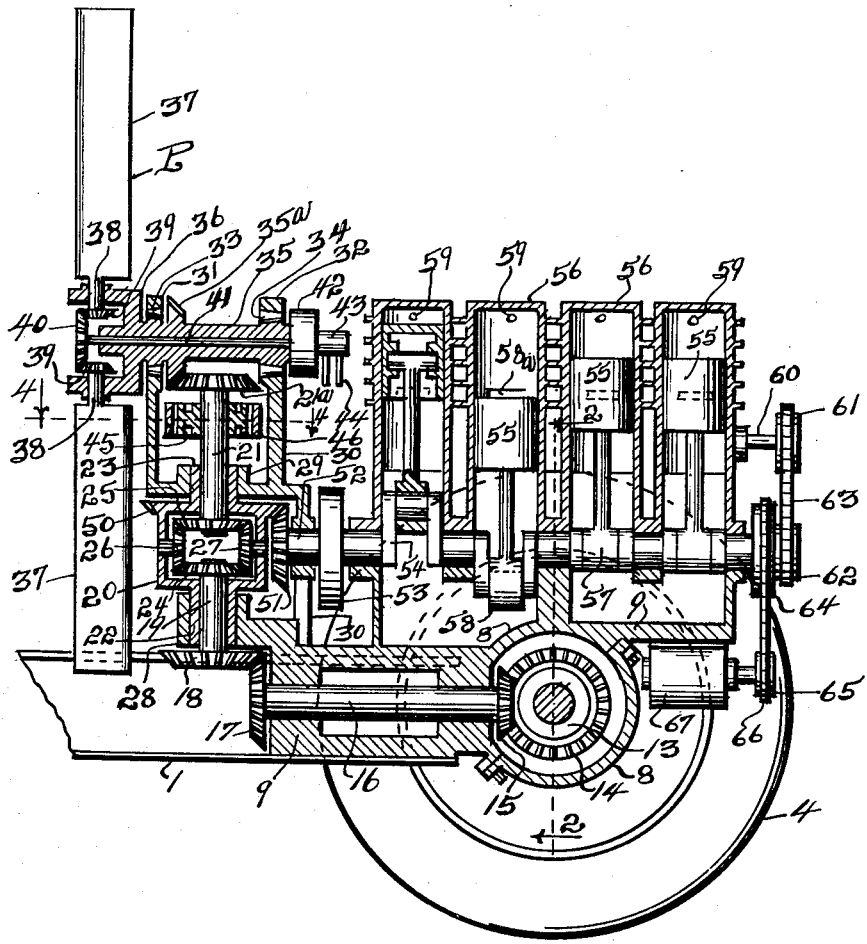
Figure 6:
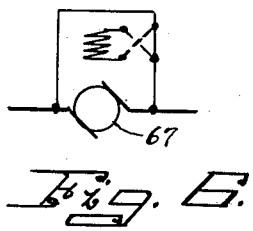

Figure 6 is an illustration of the commonly used form of reversing circuit for the electric starting motor shown as 67 in Figure 1.

Figures 2, 4:
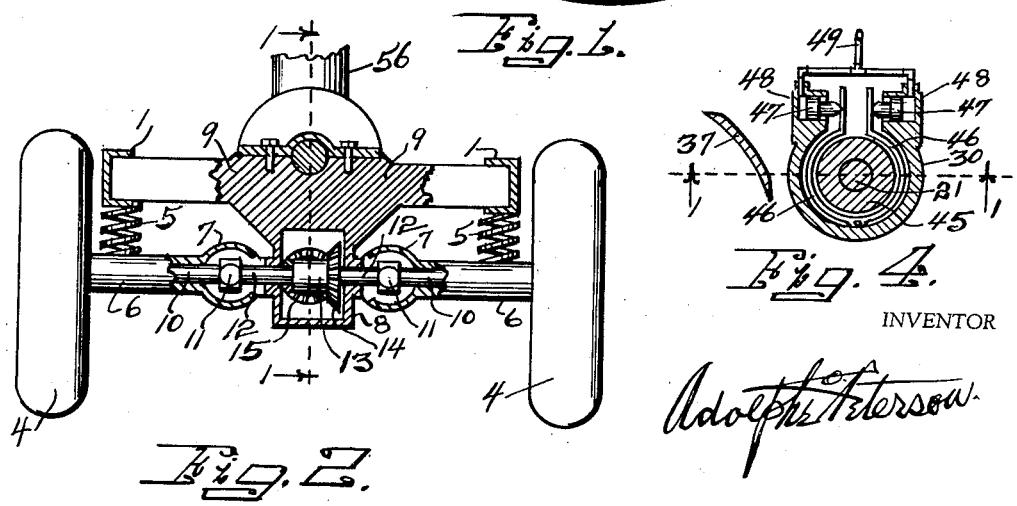
Figure 2 is a view in vertical section, at right angles to the section of Figure 1, on the line 2—2 of Figure 1, some parts being broken away, some parts being shown in full rear elevation, the figure being on a scale which is approximately three-fifths that of Figure 1.
Figure 4 is a detail cross section, on a horizontal plane, on the line 4—4 of Figure 1, to show the cross section of one blade of the air propeller, and to show the braking means for the air propeller drive.

Referring first to Figures 1, 2 and 4, which show the rear engine form of my drive means, the numeral 1 indicates one of a pair of chassis side rails forming the principal weight and strength elements of the chassis and vehicle. The side rails 1 at their front ends support the vehicle by means of any vehicle front axle means and front wheel means which means are not shown but are contemplated to be and may be any such means as are commonly used and known.

The side rails 1 at their rear ends support the vehicle and the drive means hereafter described upon the rear drive wheels, each of which is denoted 4, by means of a pair of coil springs, each of which is denoted 5. The rear wheels 4 are mounted for rotation, each on the outer end of an oscillable tubular half-axle 6. The inner ends of each half-axle 6 is oscillable or pivotable upon pivot means of any known type generally denoted 7, to swing upon an axis which is parallel to the longitudinal axis of the vehicle, each pivot means 7 having one part fixed upon one side of a differential case bearing casing 8, the latter being fixed on or formed as a part of a transmission and engine crank casing 9. The rear wheels 4 are each driven rotatably by means of its separate propeller shaft 10, one end of which is fixed to revolve with the rear wheel associated with it, and the other end of which is flexibly joined by means of the universal joint 11, with its associated differential shaft 12. The pair of differential shafts 12, driving the wheels 4, are rotatably mounted in the differential casing 13, and the latter bears fixed on it the large bevel gear 14, and has within it the customary differential gears for driving of the propeller shafts 12, as differential gear means usually drives rear wheels from a central or intermediate bevel gear. The differential gears within the differential gear casing 13 are not specifically shown except by inferential inclusion in the differential unit or casing 13.

The bevel gear 14 is in constant cooperation with the smaller bevel gear 15 and thereby with the short propeller shaft 16, and thereby through the pair of bevel gears 17, 18, with the differential shaft 19 which is one of a pair of differential shafts of a so-called propulsion differential unit generally denoted 20, and which latter has its second differential shaft 21 rotatably mounted in it as is the shaft 19, the axes of the latter being coincidental.

The differential shafts 19 and 21 in the construction, as shown, are mounted to revolve on a vertical axis, and the differential unit 20, by means of its tubular bearing shafts 22, 23, is likewise mounted to revolve on that same vertical axis. The differential shafts 19—21 have bevel gears 24, 25, respectively, fixed on their ends within differential unit 20, and between the bevel gears 24, 25, and in cooperation with each as shown there are the smaller bevel wheels 26, 27, which are each trunnioned in bearings formed in the propulsion differential unit 20, so that the bevel gears 26, 27, thereby form the balancing wheels of the differential unit 20 to drive the differential shafts 19, 21, differentially in accordance with the load on each and in the manner in which the pair of differential shafts of any differential unit are driven. There may be any number of the gears 26, 27, each disposed in the unit 20, so that its axis of rotation is transversely of the axis of the unit 20 and at right angles thereto. The tubular bearing shafts 22, 23 are revolvable in the pair of bearings 28, 29 formed on coincidental vertical axes and fixed on standards or brackets, as shown, on the transmission and engine crank casing 9, and this bracket means, generally denoted 30, also supports or has formed therewith a pair of vertically extending bearing fixtures 31, 32, respectively, the latter having roller bearings 33, 34 for radial and axial thrust, in which is rotatable the air propeller-shaft 35, the axis thereof being horizontal, parallel to the longitudinal axis or center plane of the automotive vehicle.

The air-propeller shaft 35 at its front end has a blade carrier drum 36 in which are mounted in a plane transversely of the shaft 35 and in radii of the circle about the axis of shaft 35, air propeller blades, each denoted 37, there being preferably four or more of such blades. These blades 37 are each air screw blades, each having a form such as propeller blades or air-foils usually have, and they are as large as the construction will permit, and adapted each to move as large a volume of air as may be required.

The shaft 21 drives through gear 21ª and gear 35ª to the shaft 35 and thereby to blade carrier drum 36 to increase driving ratio. Each propeller blader 37 is mounted by its axle 38 in the drum 36, to be oscillable on the radius axis, and each has internally of drum 36, fixed on it the bevel gear 39, each of which is in gear with a bevel gear 40 fixed on the end of a control shaft 41. The control shaft 41 is trunnioned in the axial center of the air-propeller shaft 35, and is adapted to be rotated in either direction relatively to shaft 35 by an electric motor control unit 42 fixed on the rear end of shaft 35. The motor control unit 42 has a contact unit 43 rotating with it, by means of which it is contacted by conducting brushes 44, to provide means for the control of the control shaft 41 and thereby for control of the blades 37, to provide for oscillation of these blades on their radial axes in drum 36, and thereby for the feathering, or the changing of the propulsion status of the blades, as air screws, so that there may thus be variable air propulsion, forwardly or rearwardly, as the operator desires. Generally the blades 37 will be stationed for the maximum displacement, rearwardly of the chassis, of air by the rotation of the air-propeller shaft 35 and its blades 37, as a unit.

The differential shaft 21 which drives directly to air-propeller shaft 35 and the propeller, may be braked, under some conditions of travel, if the operator desires, by means of a brake drum 45 fixed on differential shaft 21, and brake shoes 46, which are shown in detail in Fig. 4, the brake shoes 46 being contracted on drum 45 by means of pistons 47 in brake cylinders 48, whenever there is pressure of liquid within cylinders 48, as delivered by conduit 49. The latter may be supplied by any liquid supply and control means, such as commonly known for braking means, but which is not more particularly shown, than by the inferential inclusion, as a part of the braking means shown. This braking means is not commonly used, but only, in especial driving conditions, as hereafter described, and may in some constructions, be omitted altogether.

The propulsion differential unit 20 bears formed or fixed circumferentially thereon, a bevel gear 50, whereby the unit 20 may be driven as a unit by means of the bevel gear 51, the latter being fixed on a shaft 52, which may be one shaft of the friction or fluid type clutch means 53, the other shaft thereof, being the engine crank shaft 54. Although the friction clutch or fluid clutch 53 may be provided intermediately of the drive to bevel gear 51 and thereby to bevel gear 50, such clutch means is not indispensable, as the drive from the engine crank shaft 54 to bevel gear 50 and thereby to propulsion differential unit 20 may be direct. The engine crank shaft 54 may be the driving shaft of any type of prime mover or power plant, but is preferably the crank shaft of an internal combustion, reciprocating piston engine, having the pistons 55, which reciprocate in engine cylinders 56 and by connecting rods 57 drive the cranks 58 of the crank shaft 54. The cylinders 56 have each air inlet ports 58ª and fuel injection nozzles 59, and the air is supplied to the air ports by means of any blower means, not shown, driven by the timing shaft 60, which may also drive any fuel supply and ignition timing and supply means, not shown, in the manner in which two-cycle internal combustion engines are generally supplied. The timing shaft 60 is by sprocket wheels 61, 62, and chain 63, driven by engine crank shaft 54, and the latter may be driven by sprocket wheels 64, 65, chain 66, for starting in either direction, by means of the electric motor starting means, the latter being diagrammatically shown only, by and as unit 67. This starting means, it should particularly be noted, is capable of starting the engine crank shaft 54 to rotate in either direction, that is for forward or rearward propulsion of the vehicle, or in lieu thereof any reversing gear means may be incorporated in the driving train from the crank shaft 54 to bevel gear 51. Such starting means for starting in either direction is commonly known, and may be provided by any form thereof, and is not here shown specifically, as that would merely complicate the drawings unnecessarily. Figure 6 showing diagrammatically a form of reversing circuit which may be used for the driving of the starting motor 67 in either direction.

It should be noted that the propeller P, including its blades 37, is so located or stationed on the chassis frame that atmospheric air freely enters the front side of the cylindrical area and space swept by the blades 37 and that the air displaced by the blades 37 may freely flow away from that swept area and space to the atmosphere behind it so that atmospheric air may thus be freely displaced or propelled rearwardly. A reversal of air flow, that is from the rear side to the front side of propeller P should be substantially as free, when the controls are manipulated to procure the reverse flow of air.

Having generally described the construction, the operation is now described, as follows: The engine will be supplied with fuel by any means supplying the fuel nozzles for injection of fuel, or in lieu thereof, by any carburetion means, and the operator starts the engine crank shaft 54 for rotation in either direction, as he desires, to move the vehicle forwardly or rearwardly. Having so started the crank shaft 54, assuming it to be started in the direction for forward travel, the bevel gears 50—51, are now being driven, and the propulsion differential unit 20 is therefore started in rotation. The brake shoes 46 have been prior to starting of the engine released from drum 45, so that there is no hindrance to rotation of propeller shaft 35 and the air propeller blades 37 as a unit, and since at slow speed there is little load on shaft 35 to move the blades 37, the air-propeller unit, which presumably is now in the condition for forward driving of the vehicle, will readily take up its rotation. In the starting of the engine crank shaft 54 in revolution, for forward driving, the operator may disengage the friction or fluid clutch 53, if this be provided in the driving train to propulsion differential unit 20, and thereby the friction of the gears need not restrain the crank shaft 54, and allow the engine to idle. The blades 37 do not offer much resistance to rotation at the starting slow speed, so that starting may be accomplished even without disengagement of the clutch 53, if that be provided. The electric starting motor must in any case, be sufficiently strong to be able to start the crank shaft 54 in its revolution in either direction of rotation.

In starting there is necessarily some load at least on the differential shaft 19 from the drive thereto from the road wheels, and accordingly, there will be no rotation of the differential shaft 19, as long as the engine crank shaft delivers only a small torque, as at starting of the engine. When, however, the operator desires to start the vehicle, he increases the fuel delivery to the engine cylinders by means of the injection nozzles, by manipulating any fuel control means which may be provided as is customary for engines, such control means being not specifically shown as the engine fuel supply means is only generally and diagrammatically shown. Increase of the fuel delivery by injection or otherwise, as may be provided, results in increased power output of the engine, and thereupon the speed of rotation of crank shaft 54, bevel gear 50 and the casing of the differential unit 20 is increased, so that, as long as the load on the differential shaft 19, imposed by the road wheels, prevents revolution of this differential shaft 19, the differential shaft 21 driving the propeller shaft 35 and the air-propeller, which may be generally denoted P, will be rotated at a rapidly increasing speed, and the air-thrust of the air-propeller P, and the displacement of air thereby, and the load and torque of this air-propeller P, will be correspondingly increased, so that there is eventually reached a condition of balance of the loads on the differential shafts 19 and 21. When this condition of balance is reached, the differential shaft 19 will start its revolution, whereby this differential shaft 19 through its train of gears and propeller shafts to the road wheels 4 transmits driving power to the road wheels 4 so that these road wheels add their driving torque to the forward driving torque or impulse which is imposed upon the vehicle by the air-propeller P, which is now revolving at high speed.

In the starting phase, wherein the load upon the road wheels 4 is overcome, the driving impulse given by the air-propeller P is very large since its speed is very high, and this air-propeller P then contributes a larger than normal driving impulse and absorbs a larger than normal proportion of the driving load. Thereby the driving impulse of the air-propeller P in starting of the load absorbs, or may, according to the required starting torque, absorb nearly the full driving power of the engine exerted upon crank shaft 54, although the speed of the road wheels 4 may be zero or near zero. Due to the great thrust at high speed of the air-propeller P, and the imposition of torque by the balancing effect of the propulsion differential unit 20 through its gears, upon the differential shafts 19 and 21, whereby there is also a compensating torque imposed upon the differential shaft 19 and thereby upon the road wheels 4, the starting load is overcome, and the road wheels 4 start rotation and continued application of the engine power causes increase of the vehicle speed. As the vehicle speed increases, the speed of differential shaft 19 gradually increases and becomes nearer that of the differential shaft 21, and the speed of the air-propeller P will decrease somewhat, unless the engine power output is kept high enough to maintain the proportionately higher speed, as the vehicle increases speed. That is, the ultimate driving speed of air propeller P may remain high if the vehicle speed increases sufficiently so that this speed is necessary to maintain the balanced proportion of loads upon the differential shafts 21 and 19, respectively. And in fact, in some conditions of driving, where the vehicle travels at high speed with slight encumbrance to that travel, as when descending a low gradient road, the differential shaft 19 may rotate at a higher speed than the speed of rotation of shaft 21.

In the manner stated, the propulsion differential unit 20 will automatically maintain a balanced relation between the loads upon the respective shafts 19 and 21, at all times as long as the brake shoes 46 are disengaged from drum 45, and that is the condition which is generally maintained for travel upon a highway. Thus, at all times, through the unit 20, there is automatically maintained a balance between the load upon the air-propeller P and the load absorbed by the road wheels 4 from the unit 20, and through this balance, the driving impulse is obtained, in the normal driving relation, so that substantially one-half the load torque is absorbed by the air-propeller P and the other one-half is absorbed by the road wheels 4. The absorption of one-half of the load by the air-propeller results normally in an increased efficiency, since at the normal high road speed contemplated, for this drive means, a large proportion of the load encountered is that due to the air resistance to travel, and this air resistance is by the displacement of air by the air-propeller P efficiently overcome and the driving torque upon the road wheels need not overcome this resistance, but such driving torque upon the road wheels is in larger proportion if not wholly absorbed in the overcoming of the friction of the road wheels and their driving train in their rotation. Thus each element of the driving system, in normal travel, absorbs its natural proportion of the load.

Now, assuming that the operator desires to travel rearwardly, having stopped the vehicle, he then also stops the crank shaft 54, and thereupon delivers current, by any control means as in Figure 6, in the electric starting motor, so as to cause the crank shaft 54 to revolve in the direction opposite to the direction of rotation for forward vehicle travel. Thereupon torque is delivered to the air-propeller P and also to the road wheels 4, to impel these elements in revolution in the opposite directions to their rotation for forward vehicle travel. Thereupon the air-propeller P exerts its driving thrust in the opposite direction, that is for driving the vehicle rearwardly, by drawing air from rearwardly of the vehicle. Simultaneously driving torque is exerted in the direction for reverse travel, through the differential shaft 19, upon the road wheels 4. As only a slow speed is required for reverse travel in any vehicles, ordinarily, reverse travel of the vehicle may readily be accomplished. While there is shown and described the means for accomplishing reverse travel by reversing the rotation of crank shaft 54, it is contemplated that any means may be used in the construction for reversing the drive upon bevel gears 51—50 and thereby upon the propulsion differential unit 20, and thereby to the propelling elements. Such reversing gear means is commonly known and any such means may be used. Such reversing gear means may be incorporated as shown in connection with the modified form, Figure 3.

There may be some conditions of travel, when the operator may desire to deliver all the driving torque from the engine to the road wheels, and in that case, he causes liquid, to be delivered under pressure, by any supply and control means (not shown), to the cylinders 48 of the braking means, and thereupon the brake shoes 46 are contracted upon the drum 45, and the air-propeller P is brought to rest, while the engine power continues to be delivered to road wheels 4 through differential shaft 19. This the operator would not do, generally until the crank shaft 54 has been started in rotation.

Under some conditions of travel, and even for short rearward travel of the vehicle, it may be desirable to reverse the incidence or angle of the air-propeller blades 37, so that they may revolve in the forward direction but displace air in the opposite direction. To accomplish this the operator delivers current to motor control unit 42, to place the blades 37 in the angle for such reverse air propulsion, and the air propeller P then exerts this opposite air propulsion. This the operator might desire in traveling down hill, for braking of the vehicle, or in slippery road conditions, for vehicle braking. The blades 37 should however be designed for greatest efficiency in the direction of air propulsion, designed for forward travel of the vehicle. The blades 37 should also be designed individually to displace as large a volume of air in movement, as is possible, preferably by making them of large width, or by increasing the number of blades 37 per unit, so that the air propeller P may be of relatively small diameter so as to be included within the usual breadth of a vehicle. It is one object to produce a propulsion means of the character disclosed, which may accomplish vehicle driving by an air propeller propulsion means, in part, within the permissible limits of size and design, and this is accomplished by the division of the load in the manner here indicated.

Referring now to Figure 3, which shows a modified form, especially designed for a front engine design, the engine, generally denoted E is in this form placed at the front end of the vehicle, supported on the side rails 1, and it drives through a unit R which is a clutch and reversing unit, of any commonly known and used type, such as a planetary reversing gear, and fluid clutch, or any other type, and this unit R may have any control means for manual control as is customary for such units. The drive from unit R is through universal joint 79, propeller shaft 80, universal joint 81, to the short shaft 82 which has fixed thereon the small spur gear 83. The latter drives the larger spur gear 84 which is formed externally of and on the propulsion differential unit 20, and drive from the latter is in the differentially balanced manner, as described in connection with the first form described, to the two differential shafts 19 and 21. These shafts 19 and 21 correspond to the shafts 19—21 in the first form shown, and the shaft 19 drives a worm wheel or pinion fixed thereon and through the latter drives the larger worm wheel, these being numbered 85 and 86 respectively. The latter is fixed on a rear wheel shaft 87 either directly or with a differential drive casing interposed, and thereby drives the two wheel shafts driving road wheels 4.

The differential shaft 21 drives bevel gears 88 and thereby drives vertical shaft 89 and through the latter and bevel gears 90, drives the air propeller shaft 35, and with it the air propeller P, having the air-foil blades 37. The propulsion differential unit 20 in this form divides the load as in the first form shown. Reversing of travel is accomplished by manual reversing of the drive from the unit R, or by reversing the engine drive as in the first form shown by the electric starting motor.

Referring now to the modified form of propeller blade incidence changing means shown in Figure 5, the blades 37 in this form, each have cranks 99 formed thereon near the driving hub, and connecting links 100 connect these cranks with the pins 101 formed on disk 102 and the latter is fixed on the end of the axially movable control shaft 103. The shaft 103 is fixed to piston 104, which is reciprocable in cylinder 105. Cylinder 105 is formed on one end of the propeller shaft 35 and revolves therewith, and has interiorly a coil spring 106 adapted to yieldably thrust piston 104 and with it disk 102, rightwardly in Fig. 8, to normally retain the blades 37 in their positions for forward propulsion of the vehicle. On the opposite side of piston 104 a port 107 permits entry of air under pressure by means of supply pipe 108 from any air pressure supply and control means which may be provided in the vehicle. The bearing cap 109 is fixed with supply pipe 108 so that the part 110 of cylinder 105 revolves within it. By delivery of fluid under pressure to the rightward side of the piston 104, the operator may cause piston 104 to move leftwardly in Fig. 5, and thereby pull links 100 and cranks 99 to turn the blades 37 on their axles into the reverse air propulsion positions, simultaneously.

While I have indicated that in the normal construction, and at average normal high traveling speeds, the propulsion load for the vehicle should be absorbed substantially in the proportion of one half for the air propeller propulsion means and the other one-half for the road wheel propulsion, my device is not necessarily limited to this proportion of propulsion, as the work performed by either element of the propulsion system, will depend considerably upon the relative design and proportioning of elements, and the ratio of gearing from the common drive means to the elements and other factors such as the relation of vehicle weight to head resistance. I contemplate that any other form of division of the power output of the power plant for the vehicle may be adopted in realization of the dual form of propulsion which I have shown. While I have shown particular devices and combinations of devices in the illustration of my invention, I contemplate that other detailed devices and combinations of devices may be utilized in the realization of my invention without departing from the spirit and contemplation thereof.

I contemplate that in any particular construction, wherein there is included a motor control unit 42, for changing the angle of incidence of the blades 37 of the air propeller P, or any such control means, the angle of incidence of the blades 37, for the forward propulsion, may be changed at any time, by the operator of the vehicle, through use of the motor control unit 42, or any such means, so that thereby there is available to the operator during travel of the vehicle, a means for changing the relative torque of the propeller P in rotation and the relative quantity of air displacement by the propeller per cycle of its movement. Thereby this is available for changing the torque relation as between the road wheel means and the air displacement means constituted by propeller P, so that the propeller P may revolve at a higher or lower speed in relation to the speed of differential shaft 19 and the road wheels to produce the necessary equilibrium of drive through the differential unit 20. Thus the operator may vary the requisites for this equilibrium, that is the relative proportions of load absorbed and the relative speeds, so as to procure the utmost efficiency for any particular condition of travel, and any particular desired speed of travel. The motor control unit 42 is shown as a diagrammatic representation of a means for variation of the angle of incidence of the blades 37, it being contemplated that there are available, now, many kinds of control units for such variation of the incidence of blades of an air propeller, such as propeller P.

It is especially contemplated that the drive from the engine to the propulsion differential unit 20 may be of any kind to accomplish that drive, and that the drive from the propulsion unit 20 through its pair of differential torque applying elements, may be transmitted to the road wheels or road wheel means, of any kind, by any type and form of transmission means.

What I claim is:

1. In a vehicle propulsion means, an engine and torque shaft thereof, a satellite pinion carrier mounted to be rotatable and having engagement with said torque shaft to be driven thereby, a pair of transmission gears each mounted to be rotatable on axes coincidental with that of said carrier, freely rotatable satellite pinions supported on said satellite pinion carrier in location eccentrically of the axis of said carrier and having engagement on opposite sides with the respective members of said transmission gears, a road wheel means inter-connected with one of said transmission gears to be driven thereby for effecting vehicle propulsion by road traction, a rotatable air propeller means inter-connected with the other of said transmission gears to be driven thereby for effecting vehicle propulsion by displacement of air, and means for changing the direction of driving torque delivered by said torque shaft to said satellite pinion carrier.

2. In a vehicle propulsion means, an engine and torque shaft thereof, a satellite pinion carrier mounted to be rotatable and having engagement with said torque shaft to be driven thereby, a pair of transmission gears each mounted to be rotatable on axes coincidental with that of said carrier, freely rotatable satellite pinions supported on said satellite pinion carrier in location eccentrically of the axis of said carrier and having engagement on opposite sides with the respective members of said transmission gears, a road wheel means interconnected with one of said transmission gears to be driven thereby for effecting vehicle propulsion by road traction, a rotatable air propeller having air foil blades said air propeller being interconnected with the other of said transmission gears to be driven thereby for effecting vehicle propulsion by displacement of air, and means for changing the angle of incidence of said air foil blades of said air propeller.

3. In a vehicle propulsion means, a road wheel means and a wheel driving element in driving connection therewith, an air propeller means for propulsion and a propeller driving element in driving connection therewith, an engine and an engine shaft element driven thereby, power transmission mechanism for driving said wheel driving element and said propeller driving element, said mechanism including a gear rotating in fixed relation with one of said elements, a gear rotating in fixed relation with a second one of said elements, a satellite carrier rotating in fixed relation with the third of said elements, satellite gears borne by said carrier and meshing with both of said gears whereby the torque available on the engine shaft element is divided between the wheel driving element and the propeller driving element.

4. In a vehicle propulsion means, a road wheel means and a wheel driving element in driving connection therewith, a controllable pitch air propeller means for propulsion and a propeller driving element in driving connection therewith, an engine and an engine shaft element driven thereby, power transmission mechanism for driving said wheel driving element and said propeller driving element, said mechanism including a gear rotating in fixed relation with one of said elements, a gear rotating in fixed relation with a second one of said elements, a satellite carrier rotating in fixed relation with the third of said elements, satellite gears borne by said carrier and meshing with both of said gears whereby the torque available on the engine shaft element is divided between the wheel driving element and the propeller driving element, and means associated with the controllable pitch air propeller for adjusting the torque requirement thereof by change of the pitch of its blades.

ADOLPHE C. PETERSON.

REFERENCES CITED

The following references are of record in the file of this patent:

UNITED STATES PATENTS

| Number | Name | Date |
| --- | --- | --- |
| 881,775 | Coon | Mar. 10, 1908 |
| 1,999,296 | Juergens | Apr. 30, 1935 |
| 2,388,307 | Cargill | Nov. 6, 1945 |

FOREIGN PATENTS

| Number | Country | Date |
| --- | --- | --- |
| 329,036 | Germany | Nov. 12, 1920 |
| 373,622 | Germany | Apr. 14, 1923 |
| 698,201 | Germany | Nov. 4, 1940 |